(12) United States Patent
Gulick

(10) Patent No.: US 7,773,944 B2
(45) Date of Patent: Aug. 10, 2010

(54) RF DOMAINS

(75) Inventor: Thomas Gulick, Groton, MA (US)

(73) Assignee: Autocell Laboratories, Inc., Acton, MA (US)

( * ) Notice: Subject to any disclaimer, the term of this patent is extended or adjusted under 35 U.S.C. 154(b) by 516 days.

(21) Appl. No.: 11/145,712

(22) Filed: Jun. 6, 2005

(65) Prior Publication Data

US 2006/0274686 A1    Dec. 7, 2006

(51) Int. Cl.
*H04B 7/00* (2006.01)
(52) U.S. Cl. .................. 455/41.2; 455/41.3; 455/63.1; 455/63.2; 370/328; 370/335; 370/337
(58) Field of Classification Search .............. 370/328, 370/335, 337, 344, 347, 443, 490, 493; 455/41.2, 455/41.3, 63.1, 63.2, 527
See application file for complete search history.

(56) References Cited

U.S. PATENT DOCUMENTS

| | | | | |
|---|---|---|---|---|
| 6,795,407 | B2 * | 9/2004 | Chesson ...................... | 370/311 |
| 6,870,815 | B2 | 3/2005 | McFarland et al. | |
| 7,194,001 | B2 * | 3/2007 | Leatherbury et al. ... | 370/395.64 |
| 7,545,795 | B2 * | 6/2009 | Hinsey ........................ | 370/350 |
| 2001/0055283 | A1 * | 12/2001 | Beach ......................... | 370/328 |
| 2004/0041697 | A1 * | 3/2004 | Nattkemper et al. ... | 340/310.01 |
| 2004/0170153 | A1 * | 9/2004 | Stewart et al. .............. | 370/338 |
| 2004/0214572 | A1 * | 10/2004 | Thompson et al. ........ | 455/435.2 |
| 2004/0242159 | A1 * | 12/2004 | Calderon et al. ........... | 455/63.3 |
| 2005/0076149 | A1 * | 4/2005 | McKown et al. ............ | 709/249 |

\* cited by examiner

*Primary Examiner*—Tuan H Nguyen
(74) *Attorney, Agent, or Firm*—Anderson Gorecki & Manaras LLP

(57) ABSTRACT

A wireless access point broadcasts a unique RF domain identifier for each supported service set per radio. Within a wireless local area network ("WLAN") the RF domain identifier is unique for each supported service set, and hence identifies the service set. In addition to identifying the service sets supported by the access point, RF domain identifiers may be used to adjust transmit power in order to differentiate service sets. For example, if a first access point receives a beacon with an RF domain identifier transmitted by a second access point, the transmit power of communications associated with the service set associated with the received RF domain identifier is reduced at the first access point if that service set is also supported on the same radio by the first access point. In one embodiment the first and second access points both reduce transmit power until the beacons are no longer received by the respective nearby access point. The transmit power of communications associated with other service sets and other radios are not effected by the transmit power reduction, i.e., the access point may reduce transmit power of overlapping service set communications while contemporaneously transmitting communications of non-overlapping service sets at full power.

13 Claims, 3 Drawing Sheets

RF DOMAINS

FIELD OF THE INVENTION

This invention is generally related to wireless communications, and more particularly to identifying and differentiating service sets supported by RF access devices.

BACKGROUND OF THE INVENTION

One way in which wireless local area networks ("WLANs") are employed is to provide communications services in device-dense environments and buildings that inhibit communication with wider area wireless technologies such as cellular phone networks. A cellular phone network may employ towers capable of communicating with a wireless device at a range of up to approximately 20 km. Within a particular segment of spectrum each tower is capable of supporting communications with a finite number of wireless devices. Because of inter-tower interference there are limits to the number of cell towers that can be deployed in support of a device-dense area such as a shopping mall, airport or sports stadium. The problem is exacerbated when the device-dense area is partially shielded from RF communications with the towers. WLAN access points, in contrast with typical cellular network towers, generally have a shorter range, operate at lower power levels, are less expensive, and are relatively small in size. Hence, multiple WLAN access points may be deployed within the device-dense area in order to provide improved support for wireless communications. However, it is desirable to provide improved WLAN support for mobile services in device-dense environments.

SUMMARY OF THE INVENTION

This invention is predicated in-part on recognition that it is desirable to advertise support for multiple service sets by a single wireless access point. The invention is also predicated in-part on recognition that it may be desirable to differentiate service sets supported by access points in a WLAN.

In accordance with the invention, an apparatus such as a radio frequency ("RF") access point which provides at least one service set to a client device is operable to broadcast a RF domain identifier associated with the service set. The RF domain identifier is unique for each supported service set per radio within a wireless local area network ("WLAN"), where each radio is defined by a set of frequencies and a modulation technique, and wherein each access point may support multiple different radios. The RF domain identifier may be included in a beacon which is periodically broadcast. Consequently, a recipient of the beacon can identify a service set supported by the access point from the RF domain identifier.

In addition to identifying the service set supported by the access point, RF domain identifiers may be used to adjust transmit power in order to differentiate service sets. For example, if a first access point receives a beacon with a RF domain identifier transmitted by a second access point, the transmit power of communications associated with the service set associated with the received RF domain identifier is reduced at the first access point if that service set is also supported by the first access point. In one embodiment the first and second access points both reduce transmit power until the beacons are no longer received by the respective nearby access point. The transmit power of communications associated with other service sets are not effected by the transmit power reduction. In particular, the access point may transmit communications of the overlapping service set at reduced power while contemporaneously transmitting communications of non-overlapping service set at full power. Transmit power reduction may also be triggered by service set priority, i.e., a lower priority service set may be subjected to reduce transmit power because a higher priority, different service set is being provided on the same channel.

Those skilled in the art will recognize that a Service Set Identifier ("SSID") might be used to identify service sets. The SSID is a sequence of up to 32 alphanumeric characters or numbers defined by IEEE standard. However, the SSID is typically employed to broadcast the name of the WLAN rather than the name of a service set. Consequently, identification of multiple service sets with SSIDs might conflict with the typical use of the SSID. Further, network administrators sometimes suppress SSID broadcasts because the SSID can be employed to connect with the WLAN, and hence is a potential security vulnerability. For these reasons the RF domain identifier is superior to the SSID for the purpose of service set identification and differentiation.

DETAILED DESCRIPTION

Figure 1:
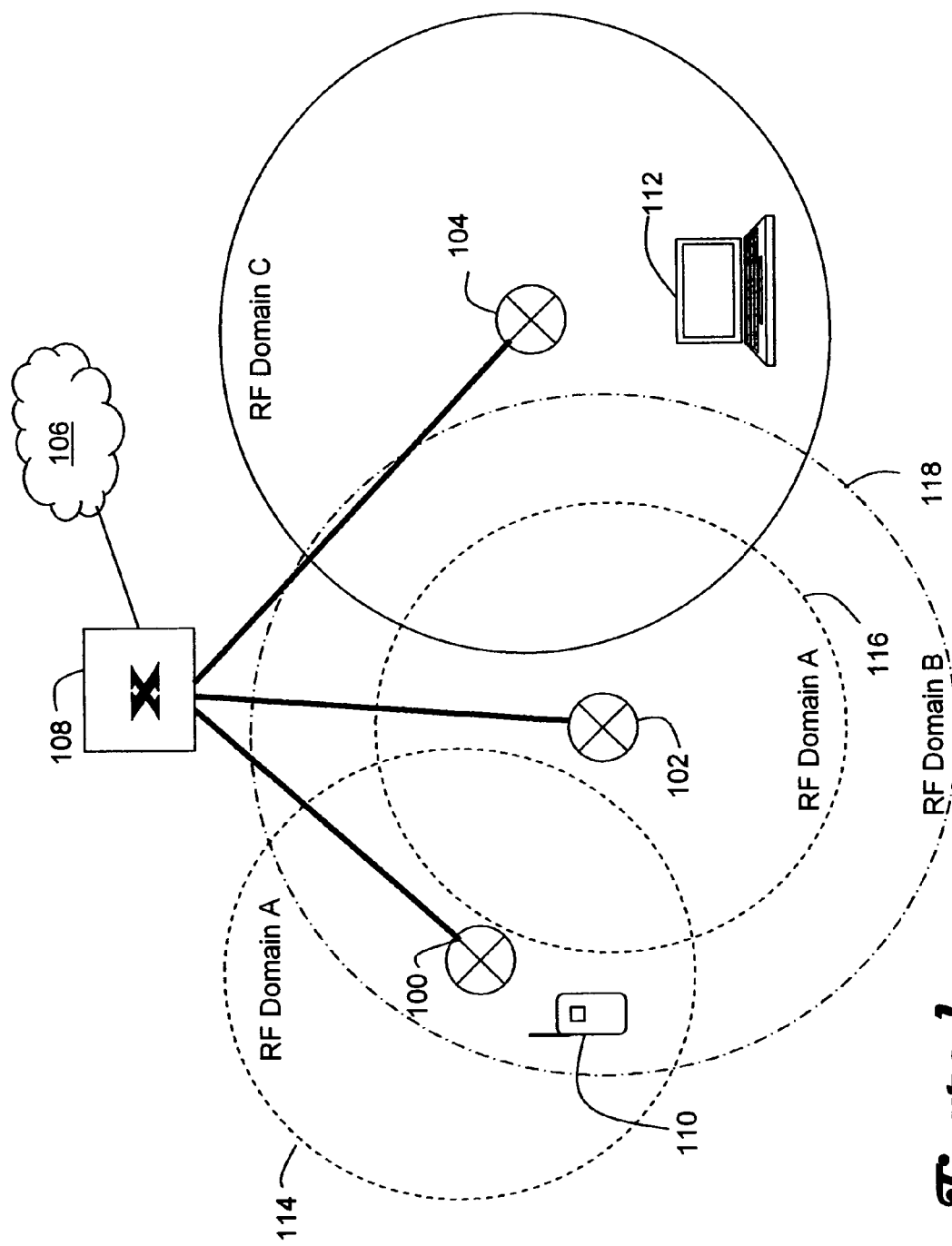
FIG. 1 illustrates a WLAN in which RF domains are broadcast to indicate service sets supported by particular access points.

FIG. 1 illustrates a wireless local area network ("WLAN") for supporting service set identification and differentiation in device-dense environments. The WLAN includes access points (100), (102), (104), which are in wired communication with a network (106) such as the internet via a switch (108). The access points are located at fixed positions within the environment, and function to provide wireless access to client devices (110), (112). In particular, a wireless client device establishes a link with one of the access points within communications range, and the access point transmits data between the device and the network via the switch. The wireless device is typically mobile, and may roam between access points.

Each access point supports at least one communications service set. A service set may include all service types provided by a communications service provider, a subset of service types provided by the service provider, a particular service type associated with a service provider, or at least one service type provided by multiple communications service providers. Examples of service types include, but are certainly not limited to, voice, video, data, Internet access, and LAN access to applications which support transactions associated with the device-dense environment such as purchasing and reserving goods and services. It should therefore be apparent that an access point could support the voice services of multiple, different service providers. Similarly, the access point could support multiple levels of data service from a single service provider. Further, the access point could support multiple service sets on different radios, e.g., on IEEE 802.11b and 802.11g.

Figure 2:
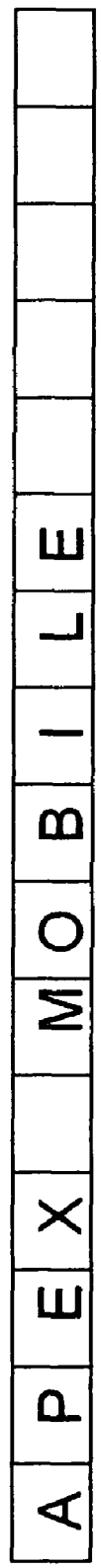
FIG. 2 illustrates a RF domain identifier field.

Referring to FIGS. 1 and 2, the access points (100-104) are configured to advertise support of particular service sets. In particular, the access points use a unique radio frequency ("RF") domain identifier (200) per radio for each supported service set. The RF domain identifiers in the illustrated example each include a 16-character field that can be used to identify a service set by name. For example, the RF domain identifier could be the name of a service provider. The RF domain identifier is broadcast by the access points in conjunction with communications associated with that service set. In the illustrated example access point (100) is broadcasting a beacon (114) indicating support of a particular service set associated with RF domain A. Consequently, RF domain identifier A is included in that beacon (114). Access point (102) also supports the service set associated with RF domain identifier A, and hence includes RF domain identifier A in a beacon (116). Access point (102) also supports the service set associated with RF domain identifier B which is broadcast in beacon (118). Access point (104) supports the service set associated with RF domain identifier C, which is included in beacon (120).

The RF domain identifiers are also employed to set transmit power levels. Because RF domain identifier B and RF domain identifier C service sets are not supported by other nearby access points, beacon (120) and beacon (118) are broadcast at full power. However, because access points (100) and (102) support the same service set associated with RF domain identifier A, service set differentiation is implemented by adjusting transmission characteristics based at least in-part on the RF domain identifiers received via the beacons. When access point (100) receives a beacon (116) indicating support of a service set that is also supported on the same channel by that access point, i.e., the RF domain identifier A service set, then a power adjustment routine is executed. The power adjustment routine, which is executed by both access points (100 and 102) causes the transmit power to be reduced until beacon (116) is not received by access point (100), and beacon (114) is not received by access point (102).

It should be noted that if access points (100) and (102) support the same service set associated with RF domain identifier A but on different radios then service set differentiation is not necessarily implemented. In particular, when access point (100) receives a beacon (116) indicating support of a service set that is also supported by that access point but on a different radio then the support is considered to be non-overlapping. Non-overlapping support of a service set does not trigger adjustment of transmit power levels.

Because a single access point may support multiple service sets and multiple radios, a single access point may broadcast a separate beacon for each supported service set per radio, i.e., a separate beacon for each RF domain identifier. In the illustrated example access point (102) is broadcasting beacon (118) indicating support of the RF domain identifier B service set at full power while contemporaneously broadcasting beacon (116) indicating support of the RF domain identifier A service set at reduced power. Further, the communications associated with support of those service sets are transmitted at the same power level as the beacon. Hence, access point (102) supports the RF domain identifier service set A only within the range of beacon (116), while supporting the RF domain identifier B service set within the range of beacon (118).

Figure 3:
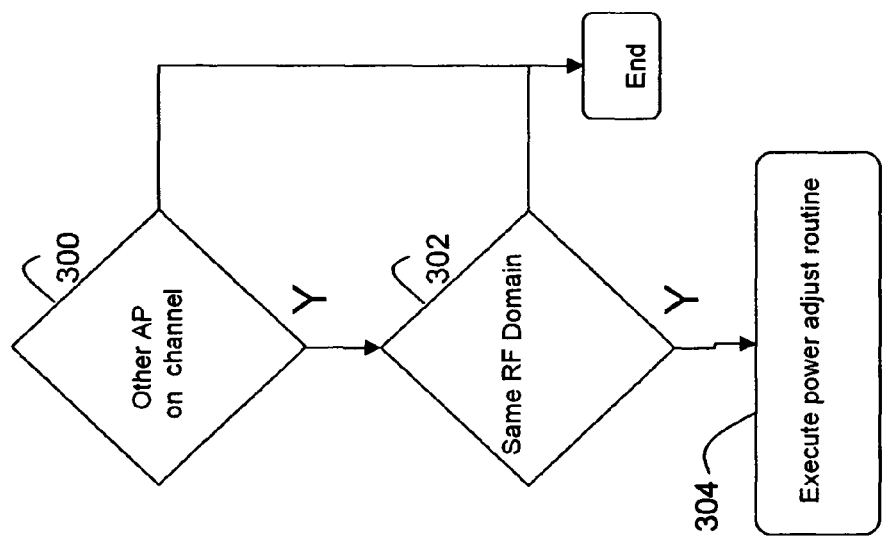
FIG. 3 illustrates a method of employing RF domains to enhance provision of wireless communications services.

Referring now to FIGS. 1 and 3, while various transmission power adjustment routines could be utilized, in the illustrated embodiment the access point is operable to execute the power adjustment routine described in U.S. patent application Ser. No. 10/780,843 entitled WIRELESS ACCESS POINT PROTOCOL METHOD, filed Feb. 18, 2004, which is incorporated herein by reference. Initially, access point (100) transmits at maximum power. Once access point (100) has successfully claimed the channel it determines whether another access point is operating on the same channel as indicated by step (300). If another access point is operating on the channel, e.g., access point (102), a determination is made whether there is an intersection between the service set it is supporting and the service set advertised by the beacons it receives as indicated in step (302). If the nearby access point (102) is broadcasting a beacon (116) advertising an intersecting service set, e.g., RF domain identifier A on the same radio, then access point (100) calculates a transmit power ("TP") backoff value and adjusts its transmit power for data transmissions associated with that service set downward to facilitate overall RF domain identifier A service set throughput in the WLAN as indicated in step (304). The power adjustment routine is contemporaneously adjusted by both access points (100, 102), provided both access points receive the beacons from one-another, until transmission power is decreased to a point at which the beacons are no longer received. The access points may maintain tables which identify nearby access points and variables such as a Max TP backoff value to facilitate power adjustment.

The power adjustment routine may also be triggered based on service set priority. For example, if access point (102) receives a beacon (120) from access point (104), the beacon (120) is examined to determine the service set that is being advertised, e.g., RF domain identifier C. Access point (102) then determines from a table maintained in memory whether any of the service sets supported by access point (102) on the same channel with the same radio have a lower priority than RF domain identifier C. The transmit power of each lower priority service set is reduced to a level calculated to not reach access point (120). The calculation may be facilitated by including an indicator of transmit power level in beacon (120). The difference between the indicated transmit power level in the beacon (120) and the actual power level of the beacon as received at access point (102) provides an indication of the transmit power level at which communications will reach access point (104).

While the invention is described through the above exemplary embodiments, it will be understood by those of ordinary skill in the art that modification to and variation of the illustrated embodiments may be made without departing from the inventive concepts herein disclosed. Moreover, while the preferred embodiments are described in connection with various illustrative structures, one skilled in the art will recognize that the system may be embodied using a variety of specific structures. Accordingly, the invention should not be viewed as limited except by the scope and spirit of the appended claims.

What is claimed is:

1. Apparatus for providing radio frequency ("RF") access in support of at least one service to a client device, comprising:
   a receiver operable to receive communications from the client device and to receive an RF domain identifier transmitted by another device;
   processing logic operable to determine whether the service associated with the received RF domain identifier has a higher priority than supported services, and to reduce transmit power of communications associated with supported services having lower priority than the service associated with the received RF domain identifier; and
   a transmitter operable to transmit communications to the client device, the transmitter being further operable to support multiple services, and to transmit an RF domain identifier associated with each supported service,
   wherein the supported service includes at least one of:
      all service types provided by a communications service provider;
      a subset of service types provided by the service provider;

a particular service type associated with a service provider; and at least one service type provided by multiple communications service providers; and wherein the service types include at least one of voice, video, data, Internet access, and local area network ("LAN") access to applications.

2. The apparatus of claim 1 wherein the transmitter is further operable to transmit a unique RF domain identifier for each supported service per radio.

3. The apparatus of claim 1 wherein the RF domain identifier is included in a beacon.

4. The apparatus of claim 1 further including processing logic operable to reduce transmit power of communications associated with a service following detection of overlapping support for the service by the other device.

5. The apparatus of claim 4 wherein communications associated with two different services are transmitted at different power levels.

6. The apparatus of claim 1 further including processing logic operable to transmit communications associated with a supported service having lower priority at a relatively lower power than a service having a relatively higher priority.

7. A method for providing radio frequency ("RF") access in support of at least one service to a client device, comprising: receiving communications from the client device; transmitting communications to the client device; supporting multiple services by broadcasting an RF domain identifier associated with each supported service, wherein the supported service includes at least one of:

all service types provided by a communications service provider;

a subset of service types provided by the service provider;

a particular service type associated with a service provider; and at least one service type provided by multiple communications service providers; and wherein the service types include at least one of voice, video, data, Internet access, and local area network ("LAN") access to applications; and receiving an RF domain identifier transmitted by another device; and determining whether the service associated with the received RF domain identifier has a higher priority than supported services; and reducing transmit power of communications associated with supported services having lower priority than the service associated with the received RF domain identifier.

8. The method of claim 7 further including the step of broadcasting a unique RF domain identifier per radio for each supported service.

9. The method of claim 7 wherein the RF domain identifier is included in a beacon.

10. The method of claim 7 further including the step of reducing transmit power of communications associated with the service associated with the received RF domain identifier, provided that service is supported via the same radio, i.e., service support overlaps.

11. The method of claim 10 further including the step of transmitting at different power levels communications associated with two different services.

12. The method of claim 7 further including the step of reducing transmit power of communications associated with supported services having lower priority than the service associated with the received RF domain identifier.

13. The method of claim 7 wherein transmit power of communications associated with supported services having equal or higher priority than the service associated with the received RF domain identifier are not reduced.

* * * * *